No. 771,171.

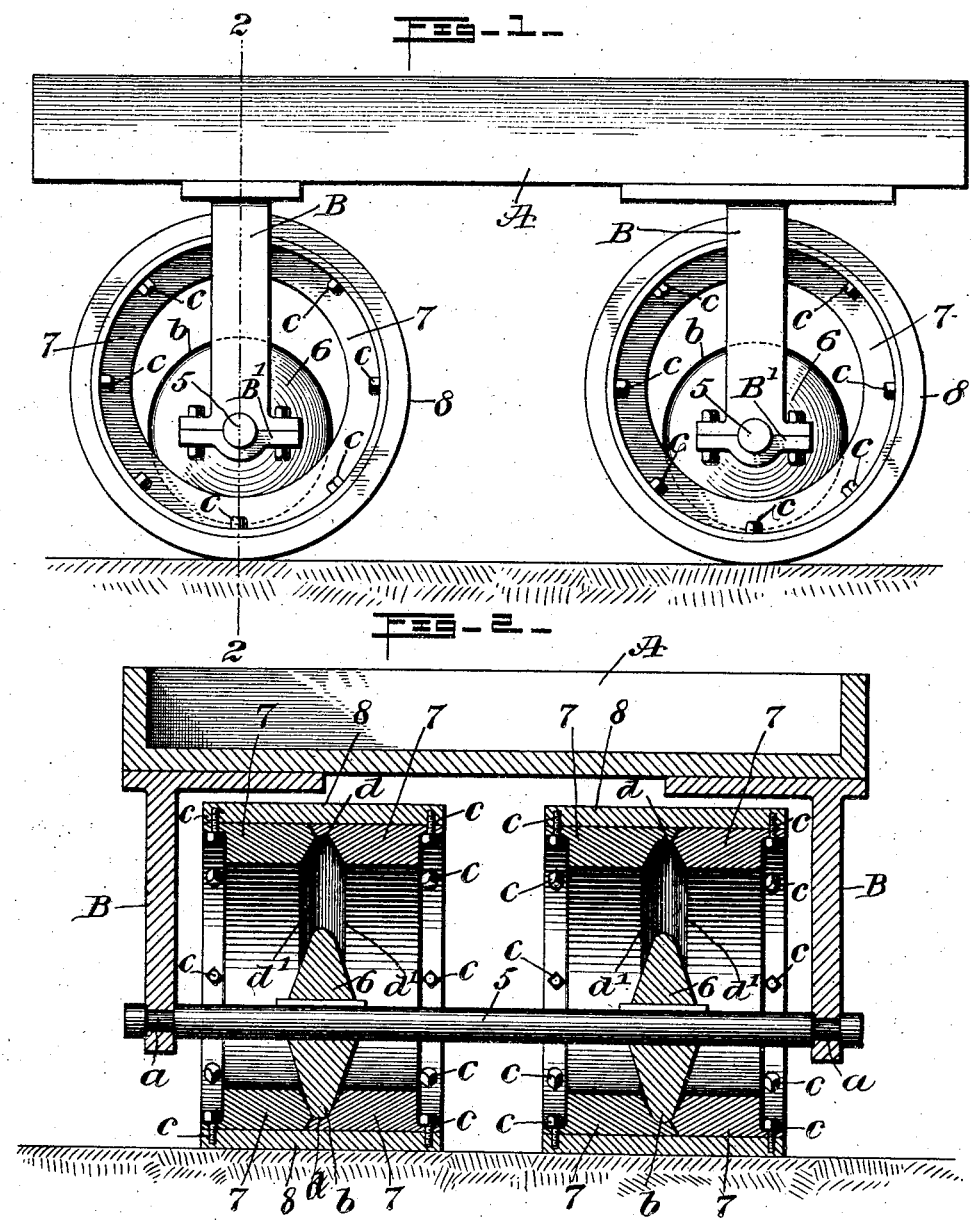

Patented September 27, 1904.

UNITED STATES PATENT OFFICE.

FREDERICK WILLIAM OLIVER, OF OSWEGO, NEW YORK.

COMPOUND VEHICLE-WHEEL.

SPECIFICATION forming part of Letters Patent No. 771,171, dated September 27, 1904.

Application filed January 6, 1904. Serial No. 187,918. (No model.)

*To all whom it may concern:*

Be it known that I, FREDERICK WILLIAM OLIVER, a citizen of the United States, and a resident of Oswego, in the county of Oswego and State of New York, have invented a new and Improved Compound Vehicle-Wheel, of which the following is a full, clear, and exact description.

The object of this invention is to provide novel details of construction for a vehicle-wheel adapted for use on railroad-cars, traction-engines, automobiles, road-wagons, or any style of vehicle which is designed to traverse rough uneven roads or be moved over soft ground on a road or in a field and which in service will minimize the power required to propel or draw the vehicle and, furthermore, render the movement of the vehicle smooth and adapt it to maintain an upright position while traveling over a rough or inclined road-bed.

The invention consists in the construction and combination of parts, as is hereinafter described, and defined in the appended claims.

Reference is to be had to the accompanying drawings, forming a part of this specification, in which similar characters of reference indicate corresponding parts in both the figures.

Figure 1 is a side view of a vehicle-body and of the improvement applied for the support and progressive movement of the body, and Fig. 2 is a transverse sectional view substantially on the line 2 2 in Fig. 1.

In illustrating the application of the invention, A represents a vehicle-body that may be a railroad-car or a road-vehicle self-propelled or drawn by any applied power. From the body A depend a series of bracket-arms B, (here shown as four,) provided with boxes B' on their lower end, that are an equal distance from the body A, and it is to be understood that these arms may be of any preferred form—as, for example, they may be pedestals for the support of any suitably-formed axle-boxes which may be best adapted for the character of the vehicle whereon the improved wheels in proper number are employed for its support and movement over a road-bed.

Upon an axle 5, which is journaled at its ends $a$ for rotatable engagement with the boxes B', two motor-wheels 6 are secured, suitably spaced from the depending arms B and from each other. The wheels 6 are of equal diameter and are otherwise similar, each wheel consisting of a preferably solid circular body, which tapers from its central bore to its periphery, this taper being effected by inclining the side walls toward each other an equal degree, thus producing a narrow rim or circumferential face $b$ on each motor-wheel, and, as is shown in Fig. 2, the periphery $b$ of each motor-wheel 6 is convexed.

A traction-wheel is provided for each motor-wheel 6 and may with advantage be constructed as shown, consisting of an inner shell or cylinder 7, preferably formed in two sections of nearly equal length, held in contact at their inner edges by the tire or outer shell 8, closely fitted upon the cylinder 7 and held thereon by the bolts $c$, which are screwed through the rabbeted end portions of the cylinder into the outer shell or tire near the ends thereof, as shown in Fig. 2. An annular channel is formed in the inner shell 7 at the junction of the two sections comprising the same, the channel having a concave bottom $d$ and outwardly-inclined sides $d'$, that diverge at a greater angle than that given to the inclination of the sides of the motor-wheel 6.

It will be evident that by a removal of one section of each inner shell 7 the traction-wheels may be respectively mounted upon one of the motor-wheels 6, and upon replacing and securing said sections of the inner shell 7 the traction-wheels will be loosely mounted upon the motor-wheels.

Assuming that the parts of the similar compound vehicle-wheels shown are assembled as represented in Fig. 2, it will be obvious that the weight of the body A and any load placed therein will be imposed upon the lower side of the motor-wheels and the adjacent surfaces of the channel-bottoms $d$, whereon the convex peripheries of the motor-wheels rest. If the body A is progressively moved in any direction, the motor-wheels will travel in the channels they occupy in the inner shells 7, which afford a continuous practically level track therefor, and simultaneously the traction-wheels are caused to traverse the road-bed or ground surface whereon they are located.

The breadth given to the traction-wheels distributes the impact of the load over such a considerable area that the road-bed, if soft, will be adapted to support a load better than if the wheels were narrow at their tread-surface. It will also be seen that the channels, consisting of the concave bottoms $d$ and inclined sides $d'$, have clearance laterally from the inclined sides of the motor-wheels 6, so that the lateral inclination of the traction-wheels in either direction, due to a rough or inclined road-bed, will not be transmitted to the body of the vehicle.

Having thus described my invention, I claim as new and desire to secure by Letters Patent—

1. A compound vehicle-wheel, comprising a traction-wheel formed with an inner shell, and an outer shell, the inner shell being bisected and annularly channeled on its inner surface near the junction of said sections, and a motor-wheel having its periphery seated in said channel on its bottom, and adapted to rotate therein.

2. A compound vehicle-wheel, comprising a traction-wheel formed with a bisected inner shell, having an annular channel at the junction of the two portions of the shell, said channel having a concave bottom and outwardly-inclined sides, an outer shell that incases the sections of the inner shell and is thereto secured near the ends of said shells, and a motor-wheel, formed of a single piece, having a convex periphery that is reduced in breadth by converging the sides of the wheel from its central bore to its periphery.

3. The combination with an axle, of a plurality of motor-wheels secured thereon, each of said wheels having its sides inclined toward its circular periphery, said periphery being convexed, and a plurality of traction-wheels, each consisting of an outer shell and a two-part inner shell, secured by its ends to the outer shell, the inner shell having an annular channel formed in its inner surface at the junction of its two sections, said channel being concaved in its bottom and having its sides flared outwardly a degree exceeding the angular divergence of the sides of the motor-wheel, so that the periphery only of the motor-wheels will have contact with the bottoms of the channels when the traction-wheels rest upon a road-bed or other support.

In testimony whereof I have signed my name to this specification in the presence of two subscribing witnesses.

FREDERICK WILLIAM OLIVER.

Witnesses:
JNO. J. SPENCER,
J. FRANK BAILLEE.